United States Patent
Allison

[11] Patent Number: 5,569,866
[45] Date of Patent: Oct. 29, 1996

[54] FORCE MEASURING DEVICE

[76] Inventor: Malcolm M. Allison, 24 Deerfoot Trail, Harvard, Mass. 01451

[21] Appl. No.: 333,211

[22] Filed: Nov. 2, 1994

[51] Int. Cl.$^6$ ........................................... G01L 1/00
[52] U.S. Cl. ................... 73/862.626; 73/862.621
[58] Field of Search ............... 73/862.541, 862.626, 73/862.627, 862.621, 862.326, 862.392, 862.393, 862.56, 862.57, 862.625, 862.36, 862.642, 862.382

[56] References Cited

U.S. PATENT DOCUMENTS

| | | |
|---|---|---|
| 2,567,488 | 9/1953 | Stovall . |
| 2,623,386 | 12/1952 | Baker .............................. 73/862.636 |
| 2,654,060 | 9/1953 | Stovall . |
| 3,033,495 | 5/1962 | Sikora .............................. 73/862.541 |
| 3,240,281 | 3/1966 | Schaevitz . |
| 4,175,428 | 11/1979 | Eilersen ............................ 73/141 A |
| 4,448,085 | 5/1984 | Lee . |
| 4,558,600 | 12/1985 | Lee ................................ 73/862.628 |
| 4,572,006 | 2/1986 | Wolfendale . |
| 4,899,600 | 2/1990 | Lee . |

Primary Examiner—Richard Chilcot
Assistant Examiner—Ronald Biegel
Attorney, Agent, or Firm—Iandiorio & Teska

[57] ABSTRACT

A force sensor which includes a member deformable along its longitudinal axis upon the application of an axial force applied thereto; a reference member interconnected with the deformable member defining an axial gap between the reference member and the deformable member; and a detection device for measuring the change in the axial gap in response to a force applied to the deformable member for measuring the amount of force applied to the deformable member.

3 Claims, 3 Drawing Sheets

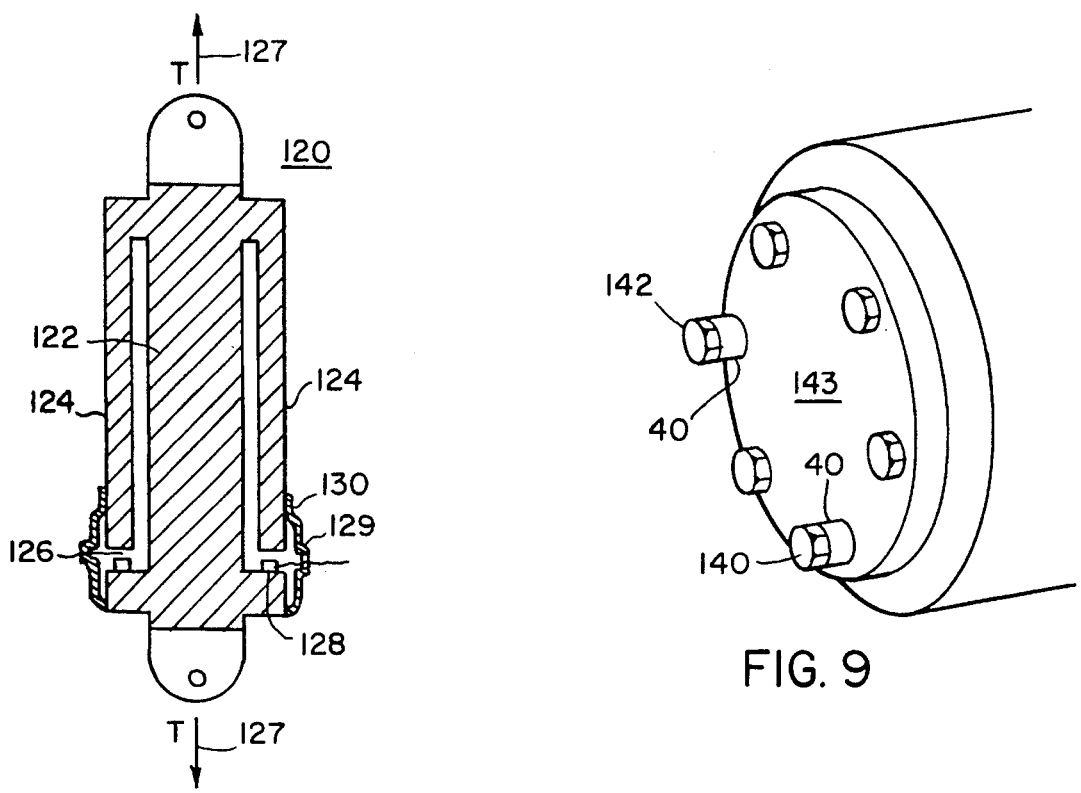
FIG. 8
FIG. 9
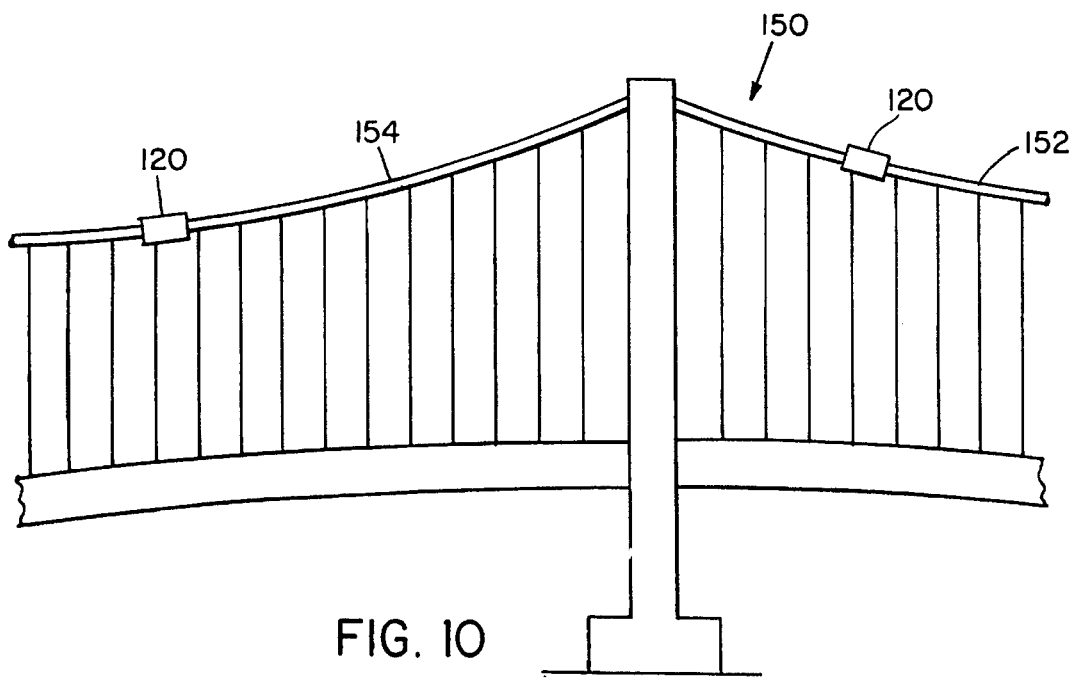
FIG. 10

FORCE MEASURING DEVICE

FIELD OF INVENTION

This invention relates to an improved and simplified force measuring device or force sensor which senses deflections due to direct tensile or compressive forces. The invention measures and continuously monitors these forces in any application including structural joints/connections and at force levels limited only by materials and available space. A complete system consists of a sensor and a readout device.

BACKGROUND OF INVENTION

In structural engineering, there is often the need to measure the tension in a bolt or another fastener or a set of fasteners (now done by measuring the torque applied to tighten a bolt) and also a need to measure the tensile force applied to structural members under tension. An example of torque measurement is a bulkhead secured by a pattern of bolts; an example of tensile force measurement is a cable under tension in the truss span of a suspension bridge.

Existing force measuring devices measure applied forces by sensing the flexure of parts of their own structure. Such devices are complex, expensive, delicate, and require frequent calibration. For example, U.S. Pat. No. 4,899,600 discloses a force transducer which includes a reference member fixed at one end and free at the other end forming a cantilever beam. This transducer measures force by the flexure of this cantilever beam. U.S. Pat. No. 4,572,006 discloses two flat spring elements and a differential capacitor detection system for measuring the magnitude of forces applied to the flat springs. This device senses the flexure of the flat springs. To other patents, U.S. Pat. Nos. 4,448,085 and 4,558,600, also use flexure to measure the forces inducing it. The primary reason flexure based devices are used is because a greater deflection results from flexure from a given force than from pure tension or compression; thus more sensitivity results in the readout. Although flexure results in greater sensitivity, strength and durability in the measuring device is sacrificed.

Although these transducers operate on the principal of detecting the change in a longitudinal gap between a flexible member and a reference member, they do not lend themselves to the measurement of a full range of applied compressive or tensile forces and they cannot be applied to fasteners or structural members under compression or tension in the field, i.e., in situ.

Moreover, many of these devices which operate on the principal of differential capacitance involve a fairly intricate arrangement of cantilever beam elements and capacitance sensor circuitry. The accuracy of some of these devices is highly affected by temperature changes and most of these devices do not work reliably in adverse environments.

Other than torque wrenches which can be inaccurate and strain gauges which are susceptible to the effects of the environment and require repeated calibration, there are no suitable force measurement devices which measure the compressive and tensile forces applied to structural fasteners and members in situ.

In engineered structures, bolted joints are the weakest part of most assemblies. Maximum efficiency and fatigue life can be achieved by torquing the fasteners to a value slightly less than their tensile yield point. The amount of torque applied to achieve this level of tension is currently measured by torque wrenches whose accuracy is dependent on the lubricity between the mating threads of the fasteners. This dependency introduces inaccuracy which can result in insufficiently tightened bolts or incipient bolt failure and thus a weakened structure.

SUMMARY OF INVENTION

It is therefore an object of this invention to provide an improved force sensor.

It is a further object of this invention to provide such an improved force sensor which can be used in situ in more applications and with greater load ranges.

It is a further object of this invention to provide such an improved force sensor which is extremely rugged and is less sensitive to the environment.

It is a further object of this invention to provide such an improved force sensor whose accuracy is less affected by temperature changes.

It is a further object of this invention to provide such an improved force sensor which can be incorporated directly with structural fasteners in the field.

It is a further object of this invention to provide such an improved force sensor which does not require intricate flexible beams.

It is a further object of this invention to provide such an improved force sensor which is easy and cost effective to manufacture and use.

This invention results from the realization that a fairly simple and rugged force sensor can be employed to measure compressive or tensile forces in situ if the flexure type systems of the prior art are eliminated and instead a deformable member is attached directly to the tensile or compressive load carrying member of a structure. An unloaded reference member is positioned along and across the end of the deformable member so as to form a very small longitudinal gap which changes in width when a force is applied to the deformable member. The relationship of the length of the deformable member to the width of the gap and the flexibility of the deformable member determines the sensitivity of the device. This arrangement forms a deflection multiplier by registering the full deformation of the deformable member, which can be any length, into the small detector gap. Thus while the deformation of the deformable member may be only two thousandths of an inch, if the initial gap between the deformable member and the reference member is three thousandths of an inch, the percent change of the gap is 67%: an easily detected difference by any number of techniques. However, since this device uses a small gap as a main feature, detection of changes in it are easily and conveniently accomplished by capacitance measuring although other electrical, mechanical or optical measuring means could be used.

This invention features and may suitably comprise, include, consist essentially of, or consist of a force sensor which has a member deformable along its longitudinal axis upon the application of an axial force applied thereto; a reference member interconnected with the deformable member defining an axial gap between the reference member and the deformable member; and detection means such as a capacitance detector for measuring the change in the axial gap in response to a force applied to the deformable member for measuring the axial force applied thereto.

The deformable member can include an axial orifice therethrough for receiving a fastener and an environmental shield is typically included for protecting the detection means from adverse environmental effects.

The deformable member may include opposing ends connected by a cylindrical wall therebetween which extends in the direction of the longitudinal axis of the deformable member. In this embodiment the deformable member includes a first gap defining surface transverse to the cylindrical wall. The reference member also includes a cylindrical wall extending in the direction of the longitudinal axis and a second gap defining surface on one end thereof.

Used as a compressive force sensor, this invention includes a compression member deformable on the application of a compressive force applied thereto; a reference member interconnected with the compression member defining an axial gap between the reference member and the compression member; and detection means for measuring the change in the axial gap in response to a compressive force applied to the compression member for measuring the amount of the compressive force applied to the compression member. The reference member can be encapsulated within the compression member to form a compression pad.

Used as a tensile force sensor, this invention includes a tensile member deformable upon the application of a tensile force applied thereto; a reference member interconnected with the tensile member defining an axial gap between the reference member and the tensile member; and detection means for measuring the change in the axial gap in response to a tensile force applied to the tension member for measuring amount of the tensile force applied to the tensile member. There are typically some means for connecting either end of the tensile member to a member under tension.

This invention also features a force sensor for measuring the tension applied to a fastener in situ comprising a deformable member including a cavity for receiving a fastener; a reference member interconnected with the deformable member defining an axial gap between the reference member and the deformable member; and detection means for measuring the change in the axial gap in response to tension applied to a fastener received though deformable member.

This invention also features a force sensor for measuring the tensile force applied to a part under tension in situ comprising a tensile member including means for attaching a part under tension thereto; a reference member interconnected with the tensile member defining gap between the reference member and the tensile member; and detection means for measuring the change in the axial gap in response to the tensile force applied to the part attached to the tensile member.

This invention also features a force sensor for measuring compressive forces applied to a deformable member along its longitudinal axis; a reference member interconnected with the deformable member to define an axial gap between the reference member and the deformable member; wherein the reference member includes a portion which extends downwardly in the direction of the longitudinal axis from an upper, axially transverse portion of the deformable member and a portion which extends upwardly in the direction of the longitudinal axis from a lower, axially transverse portion of the deformable member to form the axial gap; and detection means for measuring the change in the axial gap in response to the force applied to the deformable member; the deformable member having an axial orifice for receiving a fastener.

This invention also features a compression pad for measuring compressive forces applied to a compression member including an internal cavity and having a top portion defining an outside pressure receiving surface and an internal surface defining the upper extremity of the cavity; the compression pad also including a reference member located within the cavity having a gap defining surface spaced from the internal surface of the compression member; and detection means for detecting a change in the gap between the gap defining surface and the upper extremity of the cavity.

This invention also features a compression pad for measuring compressive force applied to a compression member having a longitudinal axis and including a top force receiving surface and a first gap defining surface transverse to the longitudinal axis; the compression pad also including a reference member having a second gap defining surface transverse to the longitudinal axis; and detection means for detecting a change in the gap between the first and second gap defining surfaces.

This invention also features a compression pad for measuring compressive forces applied to a member deformable along its longitudinal axis; the compression pad also including a reference member interconnected with the deformable member defining an axial gap between the deformable member and the reference member; and detection means for measuring the change in the axial gap in response to pressure applied to the deformable member; wherein the reference member extends parallel to the longitudinal axis, from the top of the deformable member to form the axial gap with a transverse portion of the deformable member which extends out from the bottom of the deformable member.

BRIEF DESCRIPTION OF THE DRAWINGS

Other objects, features and advantages will occur to those skilled in the art from the following description of a preferred embodiment and the accompanying drawings, in which:

FIG. 8 is a schematic cross sectional view of a force sensor according to this invention used to measure tensile forces of a member under tension;

FIG. 9 is a schematic view of the force sensor of FIG. 4 used in situ according to this invention; and FIG. 10 is a schematic view of the force sensor of FIG. 8 used in situ to measure tensile forces applied to structural members under tension.

DESCRIPTION OF PREFERRED EMBODIMENTS

Figure 1A:
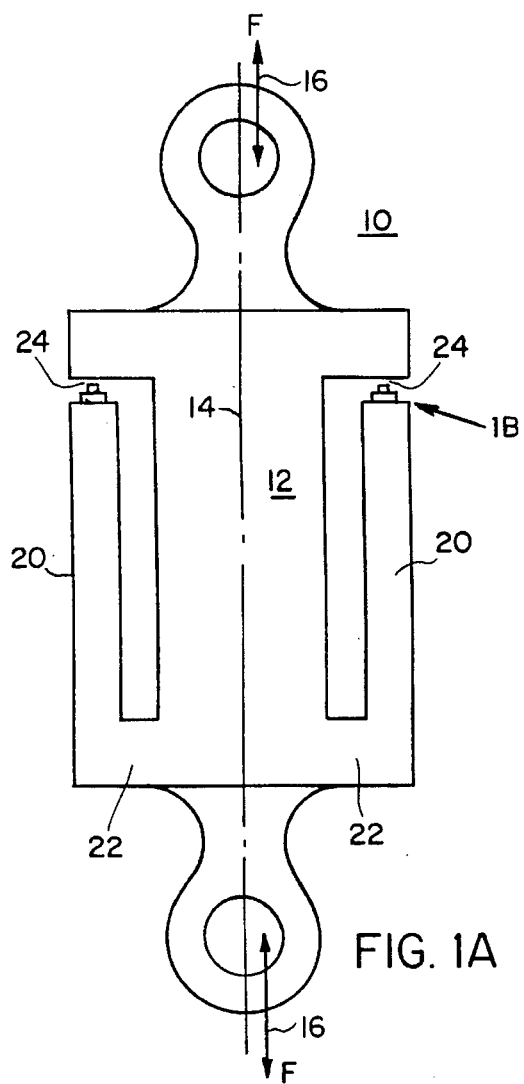
FIG. 1A is a schematic conceptualized view of the force sensor of this invention.
Figure 1B:
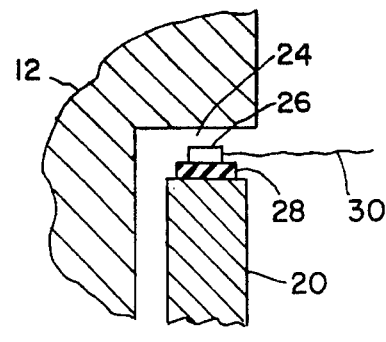
FIG. 1B is an enlarged schematic conceptual view of the axial gap and a capacitance type detector shown in FIG. 1A.

FIGS. 1A and 1B schematically depict the principal of operation of the force sensor 10 of this invention. Member 12 is deformable along longitudinal axis 14 upon the application of force 16 applied therealong. Reference member 20 is interconnected with deformable member 12 as shown at 22. Reference member 20 defines axial gap 24 (a gap orientated horizontally such that the gap changes in width in the same direction as longitudinal axis 14). There are some means for measuring the change in axial gap 24 in response to an axial force 16 applied to deformable member 12. The means for measuring may be a capacitive conductor plate 26, FIG. 1B attached to insulating body 28 which is fixed to reference member 20. A capacitance meter (not shown) connected to lead 30 reads changes in capacitance caused by the closing of gap 24 which is proportional to the applied load 16. Under tension, the change in capacitance caused by the widening of gap 24 is inversely proportional to the tension applied. The changing width of gap 24, however, could be measured using electrical or optical techniques or even mechanical measurements.

Figure 2:
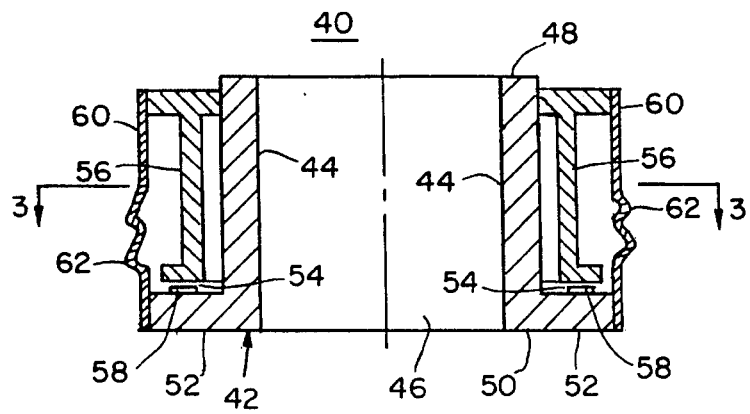
FIG. 2 is a schematic cross sectional view of the force sensor of this invention for measuring the compression caused by a fastener received by the force sensor.

In a preferred embodiment, force transducer 40, FIG. 2, includes deformable member 42 which is defined by cylindrical wall portion 44 so that a fastener (not shown) can be received through orifice 46. One end of the fastener engages top end 48 of wall 44 and the other end of the fastener engages bottom end 50 of wall 44. Deformable member 42 includes section 52 extending transversely outward from wall portion 44 to define one side of gap 54. The other side of gap 54 is defined by reference member 56 connected to deformable member 42 as shown. Capacitance sensor 58 detects a change in gap 54 due to compression of deformable member 42.

Since deformable member 42 includes axial orifice 46 to receive a bolt, force transducer 40 is particularly suited for load measurements in the field and offers significant advantage over testing or laboratory type devices shown in the prior art. The structure of force transducer 40 does not include any sensitive flexure type cantilever beams. Force transducer 40 can be used to measure the tension of the bolt in situ—that is, force transducer 40 can be coupled with a fastener in the field as discussed with reference to FIGS. 9 and 10 below.

Figure 3:
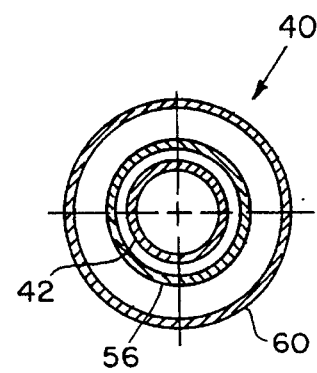
FIG. 3 is a view of the force sensor of FIG. 2 taken along line 3—3.
Figure 4:
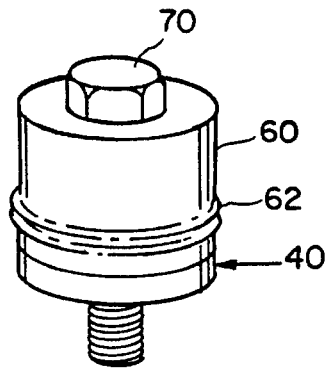
FIG. 4 is a three dimensional schematic view of the force sensor of FIG. 2.

Environmental shield 60 protects capacitance detector 58 from adverse environmental effects when force transducer 40 is used in situ. Environmental shield 60 includes biased section 62 which prevents any compaction of environmental shield 60 from impacting the measurement of the changing gap 54 due to a compressive force received by force transducer 40. Lead 64 from sensor 58 passes through seal 66 in shield 60 and is connected to a meter (not shown). As shown in FIG. 3 and 4, force sensor 40 has a circular cross-section providing a compact and rugged design for use in situ when connected to fastener 70.

Figure 5A:
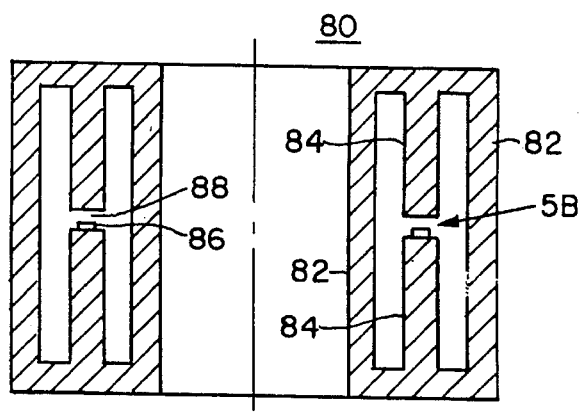
FIG. 5A is a schematic cross-sectional view of another embodiment of the force sensor of this invention.
Figure 5B:
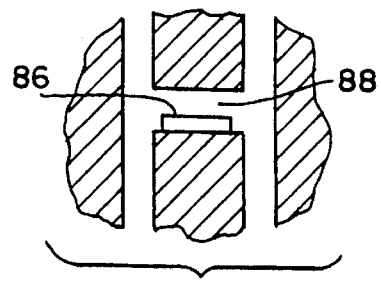
FIG. 5B is as enlarged schematic view of the axial gap of the force sensor of FIG. 5A.

In another embodiment, force sensor 80, FIG. 5A comprises compression member 82 and reference member 84 forming the "H" pattern shown. The "H" pattern is formed by having reference member 84 extend downwardly from the upper portion of the compression member 82 and upwardly from the lower portion of compression member 82 to form gap 88. Capacitive detector 86, FIG. 5B, measures the change in gap 88 due to a compressive force received by compressive member 82.

Figure 6:
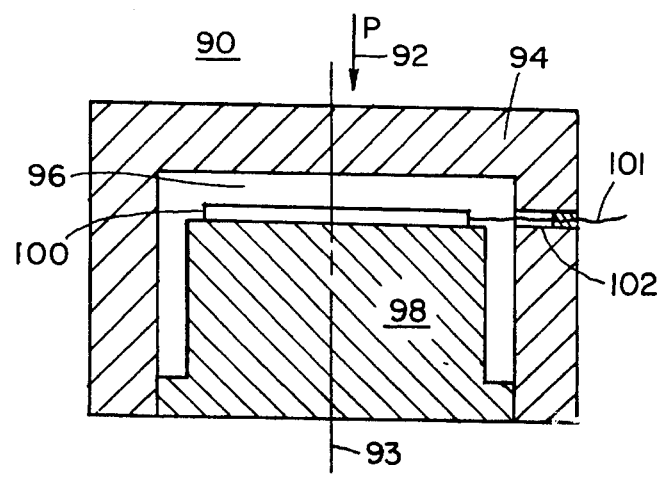
FIG. 6 is a schematic cross-sectional view of another embodiment of the force sensor of this invention used for measuring an applied compressive force.

In still another embodiment, force sensor 90, FIG. 6 is in the form of a compression pad for measuring the magnitude of compressive force P, 92, applied thereto in the direction of longitudinal axis 93 of force sensor 90. Compression member 94 includes a cavity which encapsulates reference member 98 thereby defining gap 96. Compression member 94 is driven downward tinder the influence of pressure P, 92, closing the gap 96 between compression member 94 and reference member 98.

Figure 7:
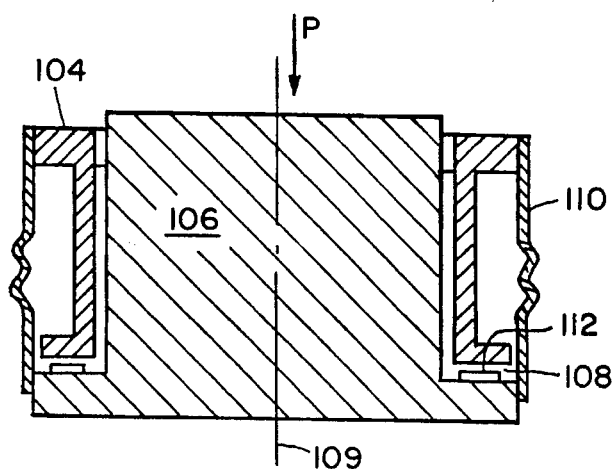
FIG. 7 is a schematic cross-sectional view of another embodiment of the force sensor of this invention used for measuring an applied compressive force.

Capacitance sensor 100 measures the change in gap 96 via lead 101 which extends through sealable orifice 102. An alternative version of this pressure pad embodiment is shown in FIG. 7 wherein reference member 104 is connected to the top of compression member 106 and extends parallel to compression member 106 to form gap 108 with the bottom of compression member 106 which extends transverse to longitudinal axis 109. An environmental shield 110 protects capacitance sensor 112.

Tensile force sensor 120, FIG. 8, includes deformable member 122 and reference member 124 which together define gap 126. Capacitance detector 128 measures the change in gap 126 due to the application of tensile force T, 127 to measure the applied tensile force. Environmental shield 130 with biased portion 129 protects the sensor 128 without affecting the measurement of tensile force T, 127.

One advantage of force sensors of this invention is that they can be used in situ. For example, as shown in FIG. 9, force transducers 40 are used with fasteners 140, 142, so that workers in the field can establish whether fasteners 140, 142 are correctly torqued securing bulkhead 143. To measure tensile forces in suspension bridge 150, FIG. 10, force sensor 120, FIG. 8, is implemented with members 152 and 154 to measure the amount of tension in members 152 and 154.

Therefore, the force sensor of this invention can be interconnected directly with a fastener or member of interest thereby offering significant advantages over the laboratory type scales shown in the prior art.

Any time the gap width is measured in any embodiment of the force sensor of this invention, the gap width expresses a proportion of the deformed length of the deformable member at that time. Furthermore, temperature changes of this device have a small, linear, and predictable affect on the proportion between the dimensions of the deformable member and the reference member which define the axial gap. When the deformable member and the reference member are fabricated from material with identical thermal expansion characteristics, the error in measurement can be controlled to be less than 1%.

In a preferred embodiment, the choice of materials used for either the deformable member or the reference member is unlimited provided that the elastic limit of the deformable member is not exceeded by the applied force. The applied stress over the length of the deformable member should not exceed the elastic limit for the material used in its fabrication or the relationship of the force measurements of the device will be lost. The change in the gap is proportional to the loads applied as long as the elastic limit of the material is not exceeded. For measurement of relatively high forces, different types of metals may be used for the deformable and reference members, and in low force applications, plastics or even fiberglass materials may be used.

Therefore, although specific features of the invention are shown in some drawings and not others, this is for convenience only as some feature may be combined with any or all of the other features in accordance with the invention.

And, other embodiments will occur to those skilled in the art and are within the following claims:

What is claimed is:

1. A force sensor comprising:

a columnar member having a longitudinal axis and being deformable in the direction of said longitudinal axis in response to a force applied to said columnar member in the direction of said longitudinal axis said columnar member having a portion extending transversely with respect to said longitudinal axis;

a reference member having a free end and having its other end connected to said columnar member, said reference member extending beside said columnar member in the direction of said longitudinal axis;

the free end of said reference member defining a gap between said reference member and the transversely extending portion of said columnar member, said gap orientated to open and close in the direction of said longitudinal axis in response to a force applied to said columnar member in the direction of said longitudinal axis; and means for measuring the amount of opening and closing of said gap in response to a force applied to said columnar member in the direction of said longitudinal axis.

2. The force sensor of claim 1 in which said columnar member includes an orifice therethrough extending in the direction of said longitudinal axis for receiving a fastener therein.

3. A force sensor comprising:

a central member having a longitudinal axis and being deformable in the direction of said longitudinal axis in response to a force applied to said central member in the direction of said longitudinal axis;

a first reference member having a free end and having its other end connected to one side of said central member, said first reference member extending along one side of said central member in the direction of said longitudinal axis;

a second reference member having a free end and having its other end connected to the other side of said central member, said second reference member extending along the other side of said central member in the direction of said longitudinal axis;

the free end of each said reference member defining a gap between said reference members and said central member, said gaps oriented to open and close in the direction of said longitudinal axis in response to a force applied to said central member in the direction of said longitudinal axis; and means for measuring the amount of opening and closing of said gaps in response to a force applied to said central member in the direction of said longitudinal axis.

* * * * *